May 6, 1969
R. L. SKINNER, SR
3,442,517
SEAL
Filed Nov. 2, 1966
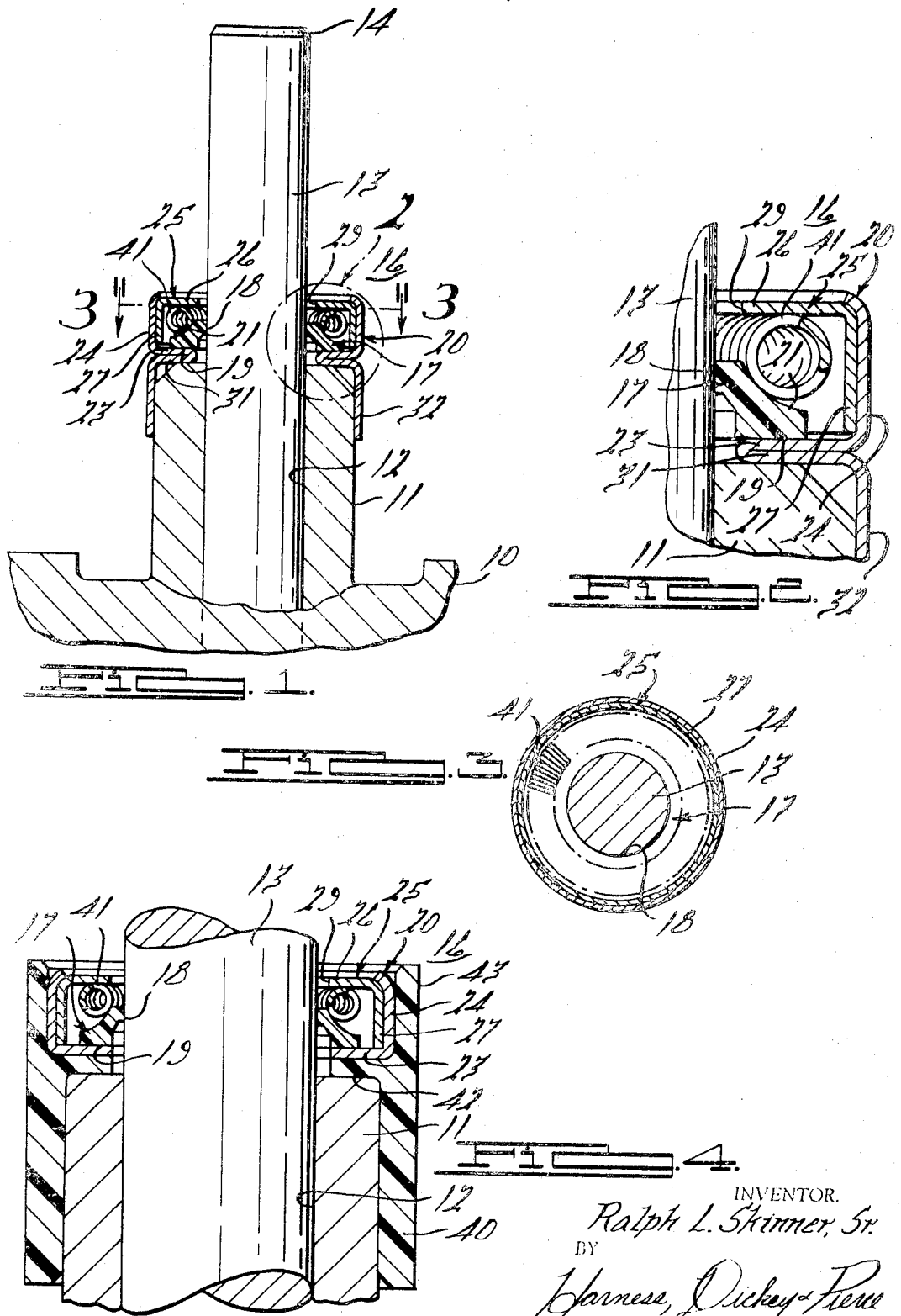
INVENTOR.
Ralph L. Skinner, Sr.
BY
Harness, Dickey & Pierce
ATTORNEYS

United States Patent Office 3,442,517
Patented May 6, 1969

1

3,442,517
SEAL
Ralph L. Skinner, Sr., Birmingham, Mich., assignor to Renniks Corporation, Birmingham, Mich., a corporation of Michigan
Filed Nov. 2, 1966, Ser. No. 591,609
Int. Cl. F16j 15/32
U.S. Cl. 277—48                    9 Claims

ABSTRACT OF THE DISCLOSURE

A seal primarily adapted for valve stems and the like having annular skirt and housing portions and a radially inwardly extending flange between such portions, an annular sealing element in the housing portion supported on the flange and having an inner annular sealing face, a garter spring surrounding the annular sealing element and bearing on a beveled surface thereof, and an annular spacer in the housing having a radial flange overlaying the spring holding the latter and the sealing element in the housing and positioned longitudinally therein by the strict the sealing element so as to maintain a sealing pressure on the inner sealing face of the latter, the spacer also having an axially extending portion fitting snugly within the housing and positioned longitudinally therein by the radial flange to maintain a constant predetermined pressure on the spring whereby to ensure a constant, uniform and predetermined pressure at the sealing face of the sealing element.

---

This invention relates to a seal for restricting the passage of fluid along a shaft and is particularly adaptable for use as a seal for a valve stem of an internal combustion engine.

In an internal combustion engine the valve stem of each intake and exhaust valve is slidably mounted in the engine, with a valve head positioned on the end thereof projecting within the combustion chamber and with the other end projecting outwardly in a position to be actuated by a conventional rocker arm. During the intake cycle of the engine, a reduced pressure is created in the cylinder which tends to suck the oil lubricating the rocker arms around each valve stem into the combustion chamber where it is burned.

While seals of the prior art have been perfectly satisfactory for providing a seal around a valve stem and for preventing lubricating oil from entering the combustion chamber of an internal combustion engine, the present invention provides a compact seal with a minimum number of parts. It is particularly useful in areas where space is at a premium and where other more complicated seals are difficult to assemble. The relative simplicity of the seal of the present invention provides low manufacturing costs. Furthermore, assembly costs in assembling the seal in an engine are substantially reduced over other known prior art seals.

This invention represents an improvement over the seal shown and described in my copending application Ser. No. 582,743, filed Sept. 28, 1966. In that application, there is disclosed a seal in which an annular housing having a pair of spaced end walls contains a sealing element having an annular face adapted to be positioned in engagement with a shaft to be sealed. The annular face of the sealing element has a sealing force exerted against it by suitable means, for example, a garter spring that is positioned against a beveled surface of the sealing element and against one of the spaced end walls. A depending skirt preferably annular in form having a radially inwardly extending wall is preferably formed integrally with this annular housing, with the radially inwardly extending wall being positioned

2 parallel to one of the spaced end walls of the annular housing and being formed integrally with it. The spaced end walls and the radially inwardly extending wall from the skirt have openings positioned therein which are relatively larger than the shaft to be sealed to permit the shaft to reciprocate within the seal. The depending skirt is formed preferably of a sheet metal material and is adapted to be press-fitted over a suitable support member for the shaft, for example, a valve guide. The radially inwardly extending wall formed with the depending skirt engages the end wall of the support or guide to properly position it in an axial direction.

In the present invention, the seal of the above-described application is provided with an annular spacer having a radially inwardly extending flange and an annular extending wall that is positioned in engagement with the annular wall of the housing so that the outer surface of the annular wall of the spacer engages the inner surface of the annular wall of the housing. The radially inwardly extending flange forms an end wall for the annular housing and the annular wall of the spacer determines the distance between the radially inwardly extending flange of the spacer and the other end wall of the annular housing and thereby determines the tension in a garter spring that is positioned in engagement with the beveled surface of the sealing element. This distance and hence the tension in the spring may be changed by varying the length of the annular wall of the spacer, the end of which is positioned in engagement with the other wall of the annular housing at its junction with the annular wall of that housing. In the preferred form of the invention, the annular wall of the housing is crimped over the spacer to position the radially inwardly extending flange in firm position on the garter spring and to secure the annular spacer in the annular housing.

In the present invention, the annular depending skirt that is adapted to be press-fitted over the support member for the shaft may be formed either of sheet metal or suitable plastic and similarly, the radially inwardly extending flange formed with this depending skirt may be formed of a plastic material. When these two elements are so formed of the plastic material, an additional annular wall is formed integrally therewith that surrounds and positions properly the annular housing of the seal so that the annular face of the sealing element may be properly positioned in engagement with the shaft to be sealed.

An object of the present invention is the provision of a seal for a shaft that is uncomplicated, inexpensive and that occupies a very minimum of space.

A further object of the invention is the provision of a seal for a valve guide which is easily assembled on the shaft and its supporting member.

Still another object of the invention is the provision of a seal for a shaft in which a single piece housing and support are provided that has sufficient flexibility to permit the seal to be assembled or positioned around the shaft to compensate for any manufacturing variations in the seal, shaft or its support member.

Still a further object of the invention is the provision of a shaft in which a spacer is provided that properly tensions a spring which applies a sealing pressure on a seal and that forms a portion of the annular housing for the seal and the spring.

Other objects and advantages of the present invention may be more readily realized as the specification is considered in connection with the attached drawings, in which:

FIGURE 1 is a sectional view of the seal, its shaft and a support member for the shaft;

FIG. 2 is an enlarged partial sectional view taken at the circle 2 of FIG. 1;

FIG. 3 is a sectional view taken along the line 3—3 of FIG. 1; and

FIG. 4 is a sectional view of another embodiment of the invention.

Although the seal of the present invention can be used to provide a seal for any rotating or reciprocating shaft, it is particularly useful for sealing the valve stems of the intake and exhaust valves of an internal combustion engine and it will therefore be described as it is used in such an engine. It should be realized, however, that the seal of the present invention has general applicability and is not limited in any sense for use in an internal combustion engine.

Referring now to the drawings in which like reference numerals designate like parts throughout the several views thereof, there is shown in FIG. 1 one type of conventional overhead valve engine comprising a head 10 having an upstanding cylindrical portion 11 in the form of a valve guide. This valve guide has a central cylindrical aperture or bore 12 for receiving the valve stem 13 of either an exhaust or intake valve for the engine. The lower end of the valve stem 13 would be formed into a valve head (not shown) that would project into the combustion chamber of the engine (not shown). The upper end 14 of the valve stem 13 is adapted to be actuated by a conventional rocker arm (not shown) to open and close the valve.

In conventional internal combustion engines the upper end 14 of the valve stem would be exposed to lubricating oil introduced around the rocker arm to provide proper lubrication. To prevent oil from this area from being sucked into the combustion chamber, a seal 16 is positioned about the valve stem 13. The seal 16 comprises a sealing element or ring 17 of low friction material having an annular sealing face 18 positioned in engagement with the valve stem 13 and a lower sealing surface 19 positioned at substantially right angles to the annular sealing face 18. The sealing ring or element 17 is also provided with an upwardly and outwardly beveled pressure surface 21. The sealing element or ring 17 is formed of a low friction material, a number of which are satisfactory, but in the preferred embodiment of the present invention a fluorocarbon resin material, for example, is used because of its superior low friction characteristics and its resistance to heat and corrosion.

The sealing ring or element 17 is enclosed in an annular housing 20 having a lower or first end wall 23 and an annular wall 24 that is generally parallel to the valve stem 13. The annular housing 20 is completed by means of an annular spacer 25 having a radially inwardly extending flange 26 and an annular wall 27 positioned at substantially right angles to the radially inwardly extending flange 26. The annular wall 27 of the spacer 25 is positioned radially inwardly of the annular wall 24 of the annular housing 20 and is in engagement with it. The radially inwardly extending flange of the spacer forms a second spaced end wall for the annular housing 20 and it terminates in an annular opening 29 that has a relatively larger diameter than the diameter of the valve stem 13.

The lower or first end wall 23 terminates outboard of the valve stem 13 to leave sufficient space to permit the valve stem 13 to reciprocate. In the embodiment of the invention shown in FIGS. 1–3, another radially extending wall 31 is formed integrally with the end wall 23 of the annular housing 20 and a depending annular skirt or wall 32 is integrally joined with the radially extending wall 31.

As can readily be seen by an inspection of the drawings, a garter spring 41 is positioned between the radially inwardly extending flange 26 of the spacer and the beveled pressure surface 21 of the sealing ring or element 17. This garter spring 41 is placed in tension by being forced down over the beveled surface 21 through the medium of the radially inwardly extending flange 26 of the spacer 25, preferably, when the annular wall 24 of the annular housing 20 is crimped over the junction of the annular wall 27 and the radially inwardly extending flange 26 of the spacer 25. This action exerts an inward sealing pressure on the annular surface 18 of the sealing ring 17 and it also forces the lower sealing surface or face 19 of the sealing ring into engagement with the first or lower wall 23 of the annular housing 20.

It will be noted from the drawings that the end of the annular wall 27 of the spacer 25 engages the lower or first end wall 23 of the annular housing 20 at the junction of this lower or first end wall 23 and annular wall 24. Thus, the length of the annular wall 27 of the spacer 25 determines the distance between the lower or first wall 23 of the annular housing and the radially inwardly extending flange 26 of the spacer 25. This, in turn, determines the tension that is placed in the garter spring 41, with this tension varying as inverse function of the length of the annular wall 27 of the spacer 25.

In the manufacture of the seal 16, an annular workable sheet metal piece of substantially cylindrical form may be employed and the lower end wall 23 of the annular housing and the radially inwardly extending flange 31 may be formed in an upsetting operation. The inner diameter of the annular workable sheet metal piece should be substantially the same as the outer diameter of the valve guide or support member 11 which may be machined to receive the annular skirt or wall 32 in a press or interference fit relationship. Thereafter the sealing ring 17 may be positioned on the lower wall 23 so that the sealing or pressure surface 19 is in engagement with it. The garter spring 41 may then be placed over the beveled surface 21 of the sealing ring or element 17 and spacer is then inserted in position with the outer surface of the annular wall 27 engaging the inner surface of the annular wall 24 and with the end of the annular wall 27 of the spacer 25 engaging the end wall 23 of the annular housing 20 at the junction of the end wall 23 and the annular wall 24. Thereafter, the annular wall 24 of the annular housing 20 is crimped over the junction of the annular wall 27 and the radially inwardly extending flange 26 of the spacer 25. This forces the garter spring 41 downwardly on the beveled surface 21 thereby forcing the pressure surface 19 into engagement with the lower end wall 23 and exerting an inward sealing pressure on the annular sealing face 18 that is adapted to engage the valve stem 13.

The pressure or sealing surface 19 of the sealing element 17 that is in engagement with the lower wall 23, in addition to effecting a seal between the sealing element or ring 17 and the lower wall 23 of the annular housing, prevents the sealing ring 17 from cocking with respect to the annular housing thereby ensuring that the inner annular sealing surface 18 engages the valve stem 13 in a proper sealing engagement. Due to the good antifriction properties of Teflon, or other similar materials used, the pressure between the pressure or sealing surface 19 and the lower wall 23 does not prevent easy sliding movement between these two surfaces. This material also provides easy sliding movement between the valve stem 13 and the inner annular sealing surface 18 of the sealing element or ring 17.

It can be appreciated that the annular or depending skirt 32 is positioned over the support or valve guide 11 for the valve stem 13 to properly position and support the annular housing 20 and the sealing ring 17 in proper peripheral relationship with respect to the valve stem 13. The radially inwardly extending wall 31 that is integrally formed with the lower depending wall or skirt 32 engages the end of the support member or valve guide 11 to properly position the seal axially with respect to the valve stem 13. Because the depending annular skirt 32, the radially inwardly extending wall 31 and preferably certain parts of the annular housing 20, as well, are formed of a single piece workable sheet metal, for example, .010 in.

cold rolled steel, the seal assembly 16 has a certain amount of resilience. This will permit it to be easily positioned over the support member or valve guide 11 so that the sealing ring 17 is in proper position with respect to the valve stem 13. If there are any manufacturing tolerances or minor errors in the dimensions of any of the components, this inherent resiliency will still permit proper assembly and proper sealing action.

Another embodiment of the invention is shown in FIG. 4. In this embodiment, an annular depending skirt 40, a radially inwardly extending flange 42 and an upstanding annular wall 43 are integrally formed of a plastic material, preferably a fluorocarbon resin material, such as, Teflon. The annular depending skirt 40 is adapted to be press-fitted over the outer surface of the valve guide 11, and it therefore performs the function performed by the annular depending skirt 32 of the embodiment shown in FIGS. 1–3. The radially inwardly extending flange 42 is adapted to engage the end wall of the guide 11, and it, therefore, performs the function performed by the radially inwardly extending flange 31 of the embodiment of the invention shown in FIGS. 1–3. The upstanding annular wall 43 surrounds and confines the annular wall 24 of the housing 20 while the end wall 23 thereof is positioned in engagement with the radially inwardly extending flange 42. In all other respects, this embodiment of the invention is the same as that shown in FIGS. 1–3.

It can be appreciated also that the plastic material employed in the embodiment of the invention shown in FIG. 4 has the inherent resiliency to compensate for any manufacturing tolerances or minor errors in the dimensions of any of the components and it thereby permits proper assembly and proper sealing action if such minor errors in the dimensions of the components do occur.

The sealing element 17 with its coacting garter spring 41 and the sealing action thereof are more fully described in my Patent No. 3,069,175, issued Dec. 13, 1962.

The present invention thus provides an inexpensive and uncomplicated seal for a shaft that occupies a very minimum of space in the environment in which it is used. This can readily be appreciated by an inspection of the drawings in which it can be seen that the peripheral dimension or, stated otherwise, the diameter of the seal 16 is substantially the same as the support or valve guide 11 and exceeds it only by the dimension of the sheet metal of which the depending skirt 32 and the annular housing 20 are formed or by the dimension of the plastic material from which the depending skirt 40 is formed. Thus, in internal combustion engines where space is at a premium, this seal may be employed with great facility. Other seals found in the prior art that have outer spring arrangements such as that shown in my above-mentioned patent, cannot be so readily or easily employed.

It can also be appreciated that the present invention is relatively simple to assemble in an internal combustion engine or other environment in which it is used, and that it has the inherent capability of compensating for manufacturing variances in the shaft and its support member, for example, in the valve stem and the valve guide illustrated in the drawings.

Additionally, the present invention provides a spacing element that has a radially inwardly extending flange forming one end wall of the annular housing containing a sealing element and a spring means for exerting an annular inward sealing force on the annular sealing face. This radially iwardly extending flange is positioned in engagement with the spring means and an annular wall formed integrally therewith engages the other end wall of the housing and sets or determines the distance between this end wall and the radially inwardly extending flange of the spacer that is positioned against the above-mentioned spring means. This permits a proper tensioning of the spring means, the tension of which is an inverse function of the distance between the two end walls of the annular housing in which it is positioned.

The present invention can be of great value when used with a two-cycle internal combustion engine in which the exhaust valves operate at twice the speed of those in a four-cycle engine. This is true since the seal is of a self-contained static construction in which all critical surfaces are sealed by the spring energized fluorocarbon seal and are held in position without being affected by the speed of the engine or the motion of the valves.

While it will be apparent that the preferred embodiment of the invention herein disclosed is well calculated to fulfill the objects above stated, it will be appreciated that the invention is susceptible to modification, variation and change without departing from the proper scope or fair meaning of the following claims.

What is claimed is:

1. A seal assembly for sealing peripherally against a shaft that is supported in a guide having an outer surface, an end wall and a bore extending through the guide and the end wall with the bore being adapted to receive the shaft comprising a skirt adapted to be positioned over the outer surface of the guide in press-fit relationship, a radially inwardly extending flange connected to said skirt and adapted to engage the end wall of the guide, an annular housing connected to said radially inwardly extending flange, sealing means positioned in said annular housing and having a sealing surface adapted to engage the shaft, normally stressed resilient means positioned in said annular housing engaging said sealing means and exerting a constrictive force thereagainst for maintaining a sealing pressure on said sealing surface, said annular housing having a radially inwardly extending wall supporting said sealing means in said housing and an annular wall joined thereto and surrounding said sealing means, a spacer element having a radially inwardly extending flange overlaying said resilient means to stress the same and having means thereon positioned by said radially inwardly extending wall for maintaining a uniform distance between said radially inwardly extending wall and the radially inwardly extending flange of said spacer whereby to maintain said resilient means in a constant predetermined stressed condition and an essentially uniform sealing pressure on said sealing surface.

2. The combination of claim 1 in which said skirt and said radially inwardly extending flange connected to said skirt and adapted to engage the end wall of the guide are formed of a plastic material.

3. The combination of claim 2 including an annular wall formed of a pastic material extending from said radially inwardly extending flange and in the opposite direction from said skirt, the inner periphery of said annular wall being positioned in firm engagement with the outer periphery of the annular wall of said annular housing.

4. The combination of claim 1 in which said skirt and said radially inwardly extending flange connected to said skirt and adapted to engage the end wall of said guide are constructed of sheet metal.

5. The combination of claim 1 in which said last-mentioned means comprises an annular wall concentrically disposed inwardly of said annular wall of said housing and being in engagement throughout its peripheral surface with said annular wall of said housing.

6. The combination of claim 5 in which said annular wall of said housing is spun over into engagement with said spacer element to force said annular wall of said spacer element into engagement with said radially inwardly extending wall of said annular housing.

7. The combination of claim 1 in which said skirt and said radially inwardly extending flange connected to said skirt and adapted to engage the end wall of the guide are formed of a plastic material and in which said last-mentioned means comprises an annular wall concentrically disposed inwardly of said annular wall of said housing and being in engagement throughout its peripheral surface with said annular wall of said housing.

8. The combination of claim 7 in which said annular wall of said housing is spun over into engagement with said spacer element to force said annular wall of said spacer element into engagement with said radially inwardly extending wall of said annular housing.

9. The combination of claim 1 in which said skirt and said radially inwardly extending flange connected to said skirt and adapted to engage the end wall of said guide are constructed of sheet metal and in which said last-mentioned means comprises an annular wall concentrically disposed inwardly of said annular wall of said housing and being in engagement throughout its peripheral surface with said annular wall of said housing.

References Cited

UNITED STATES PATENTS

| | | | |
|---|---|---|---|
| 2,157,867 | 5/1939 | Robertson et al. | 277—187 X |
| 3,069,174 | 12/1962 | Skinner | 277—48 |
| 3,326,562 | 6/1967 | Deuring | 277—182 |

SAMUEL ROTHBERG, *Primary Examiner.*

U.S. Cl. X.R.

277—186, 187; 123—188

PO-1050
(5/69)

UNITED STATES PATENT OFFICE
CERTIFICATE OF CORRECTION

Patent No. 3,442,517            Dated May 6, 1969

Inventor(s) Ralph L. Skinner, Sr.

It is certified that error appears in the above-identified patent and that said Letters Patent are hereby corrected as shown below:

Column 1, line 21, after "and" cancel "positioned longitudinally therein by the strict" and insert -- normally tensioning the spring to constrict --.

Column 5, line 66, "iwardly" should be "inwardly".

Column 6, claim 3, line 2, "pastic" should be "plastic".

**SIGNED AND
SEALED
MAR 10 1970**

(SEAL)
Attest:

Edward M. Fletcher, Jr.
Attesting Officer

WILLIAM E. SCHUYLER, JR.
Commissioner of Patents